(12) United States Patent
Parks

(10) Patent No.: US 7,360,700 B2
(45) Date of Patent: Apr. 22, 2008

(54) WHEEL ASSEMBLY IDENTIFICATION DEVICE

(75) Inventor: Stefan A. Parks, Smyrna, TN (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 11/784,803

(22) Filed: Apr. 10, 2007

(65) Prior Publication Data

US 2007/0187517 A1    Aug. 16, 2007

Related U.S. Application Data

(63) Continuation of application No. 10/344,786, filed as application No. PCT/US01/43895 on Nov. 13, 2001, now Pat. No. 7,243,852.

(60) Provisional application No. 60/247,862, filed on Nov. 13, 2000.

(51) Int. Cl.
    *G07B 15/02*     (2006.01)
(52) U.S. Cl. ............... 235/384; 235/385; 235/487; 340/10.52; 340/572.1; 340/572.8
(58) Field of Classification Search ........ 235/487, 235/384, 385; 340/438, 446, 447–448, 572.1, 340/572.8, 10.52
See application file for complete search history.

(56) References Cited

U.S. PATENT DOCUMENTS

| | | | |
|---|---|---|---|
| 4,695,823 A | 9/1987 | Vernon | |
| 4,785,563 A | 11/1988 | Friedman | |
| 4,857,893 A | 8/1989 | Carroll | |
| 5,600,301 A | 2/1997 | Robinson, III | |
| 5,682,143 A * | 10/1997 | Brady et al. | 340/572.7 |
| 5,768,813 A | 6/1998 | Reboul et al. | |
| 5,802,754 A | 9/1998 | Watanabe | |
| 6,105,860 A | 8/2000 | Hattori | |
| 6,239,737 B1 | 5/2001 | Black | |
| 6,843,628 B1 | 1/2005 | Hoffmeister et al. | |

FOREIGN PATENT DOCUMENTS

| | | |
|---|---|---|
| DE | 3533152 | 3/1987 |
| EP | 619243 | 10/1994 |
| JP | 11240523 | 9/1999 |
| JP | 11352240 | 12/1999 |
| JP | 2000132102 | 5/2000 |
| JP | 2000304870 | 11/2000 |
| JP | 2002216084 | 8/2002 |

\* cited by examiner

*Primary Examiner*—Michael G. Lee
*Assistant Examiner*—Kristy A. Haupt
(74) *Attorney, Agent, or Firm*—Michael Sand; Thomas R. Kingsbury

(57) ABSTRACT

An identification device modified to fit into a lug nut hole of a rim of a wheel assembly to supply information to a remote interrogator pertaining to the tire, rim, and valve stem prior to mounting the wheel assembly on the vehicle. The device includes a conical body molded of a plastic material and has a coded chip embedded in the plastic material. The chip is provided with either a passive or an active electronic circuit for relaying identifying information to a remote interrogator. A spring device is mounted on the body to removably retain the device within the lug hole until the wheel assembly is mounted on a vehicle.

12 Claims, 2 Drawing Sheets

WHEEL ASSEMBLY IDENTIFICATION DEVICE

CROSS REFERENCE TO RELATED APPLICATION

This application is a continuation of U.S. patent application Ser. No. 10/344,786, filed Feb. 13, 2003; now U.S. Pat. No. 7,243,852 which is a National Phase application of PCT/US01/43895, filed Nov. 13, 2001; which application claims priority from U.S. Provisional Application Ser. No. 60/247,862, filed Nov. 13, 2000; the disclosures of which are incorporated herein by reference.

BACKGROUND OF THE INVENTION

1. Technical Field

This invention relates to devices for identification of tires and rims of a wheel assembly. More particularly, the invention relates to a readily insertable and removable device placed in the lug nut hole of the wheel assembly rim for providing information relating to the wheel assembly to a remote interrogator.

2. Background Information

One of the components which is assembled during the construction of a vehicle is the wheel assembly consisting of a rim and a tire mounted thereon in an air-tight relationship which is assembled with the axle and other vehicle components during the vehicle assembly process. It is important in order to control the manufacture of the vehicle and for identification purposes, that the wheel assembly, including the rim and tire, be marked and identified so that the proper tire and rim are matched to each other and to the particular vehicle on which it will ultimately be mounted. This information is also used for inventory control and quality control.

Various types of visual markings are currently used on the rim and tire, including the valve stem which is mounted on the rim. Identification of the valve stem has become increasingly important due to certain signaling devices mounted in certain valve stems. Many of these prior identification devices are visual markings on the components or are various types of solid state chips containing various circuitries attached to one or more of the components. Although these prior devices and methods of use have proven satisfactory, it is desirable to provide an identification device which is relatively inexpensive and is easily attached and removed from the wheel assembly once it is no longer required, that is after the wheel assembly has been placed on the vehicle and the identification data obtained therefrom. Furthermore, where electronic chips are utilized, it is desirable to be able to reuse the chips on similar wheel assemblies for cost savings.

BRIEF SUMMARY OF THE INVENTION

The present invention allows the identification of wheel assemblies including the individual components thereof, namely, the tire, rim and valve stem, throughout the vehicle assembly and wheel assembly mounting process.

Another feature of the invention is that the identification device eliminates consumable materials heretofore required to provide the same identification data.

The present invention also allows identification of the tire, rim and valve of a wheel assembly without permanently or temporarily marking the components or applying adhesive layers heretofore used to identify the various components of a wheel assembly.

A further aspect of the invention is to enable the identification device to be easily installed into one of the plurality of existing lug holes in a rim, thereby facilitating the attachment of the device to the wheel assembly by simply inserting the device into a lug hole where it is retained by a spring mechanism.

Still another feature of the invention is the ease of removing the identification device from the lug hole automatically when placing the wheel assembly on an axle since the wheel stud automatically pops the device from the lug nut hole enabling the identification device to be retrieved and recycled for subsequent use.

Another aspect of the invention is forming the device inexpensively of a plastic material with the electronic chip being embedded therein where it is protected from damage and any harsh environment in which it will be utilized.

Still another feature of the invention is providing a device which both transmits stored information to a remote interrogator as well as receiving information from an outside source and storing the information for subsequent use.

BRIEF DESCRIPTION OF THE SEVERAL VIEWS OF THE DRAWINGS

Similar numerals refer to similar parts throughout the drawings.

DETAILED DESCRIPTION OF THE INVENTION

Figure 2:
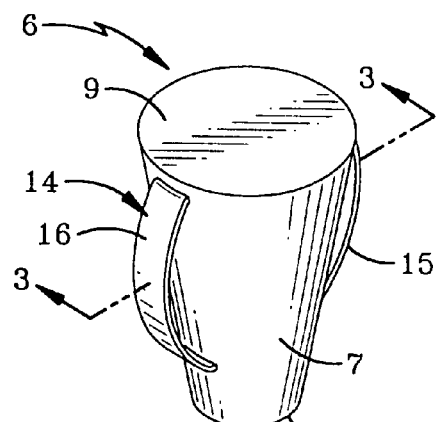
FIG. 2 is an enlarged perspective view of the identification device.
Figure 1:
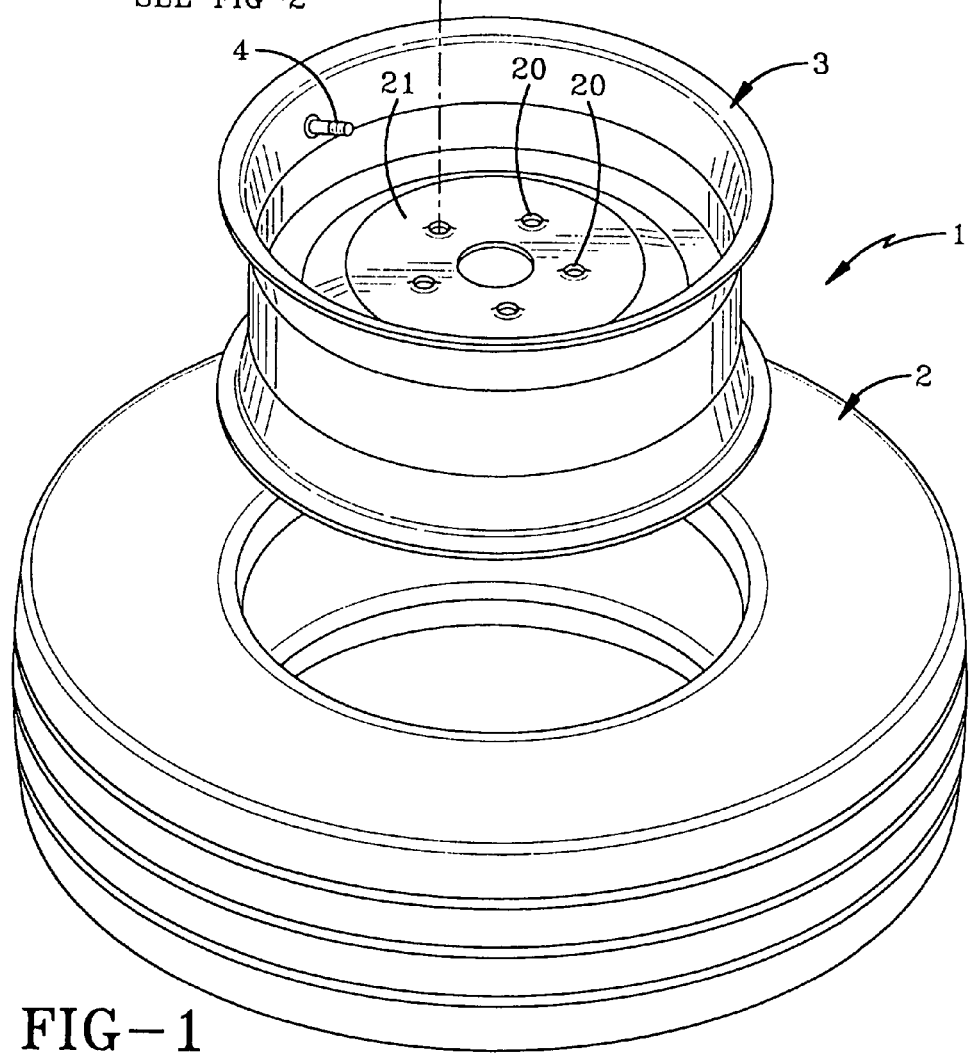
FIG. 1 is an exploded perspective view of the identification device and wheel assembly.

FIG. 1 shows a wheel assembly indicated generally at 1, including a usual pneumatic tire 2, a rim 3, and a usual valve stem 4 mounted therein. The identification device is indicated generally at 6, and preferably includes a conical-shaped body 7 molded of plastic material preferably having opposed planar top and bottom surfaces 9 and 10, respectively.

Figure 3:
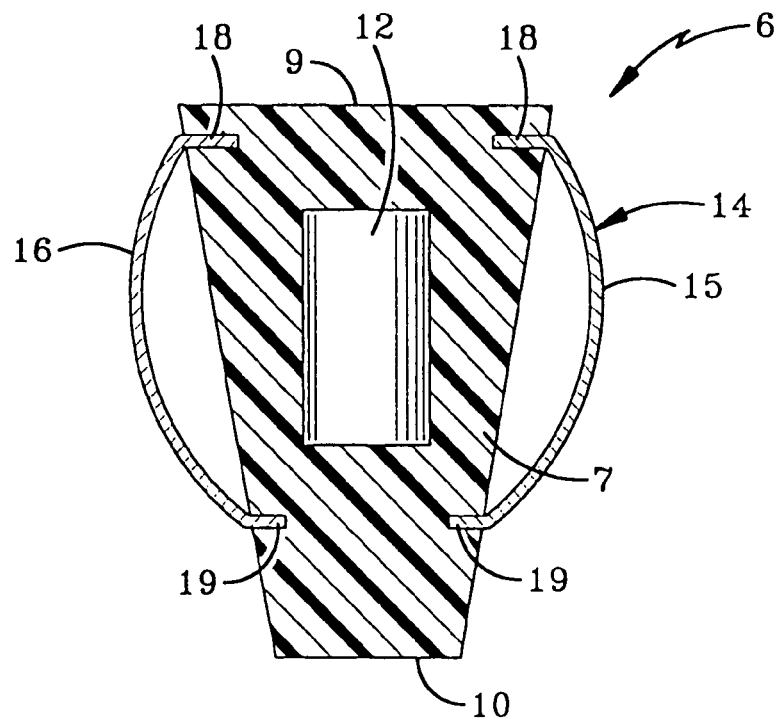
FIG. 3 is an enlarged sectional view taken along lines 3-3, FIG. 2.
Figure 4:
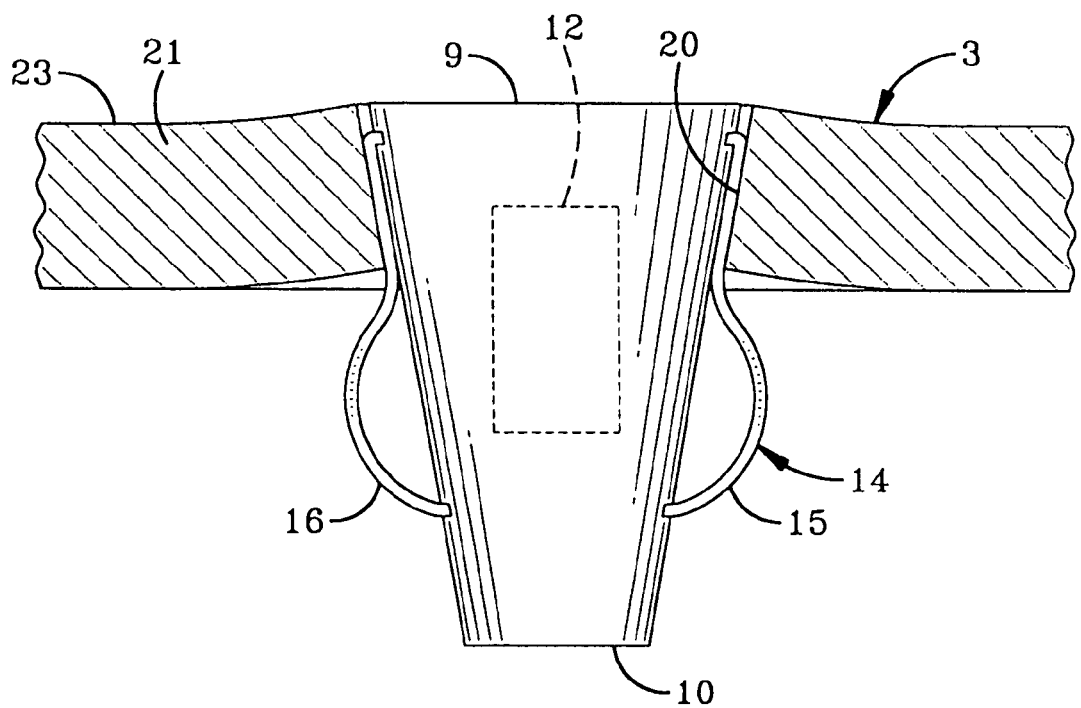
FIG. 4 is an enlarged elevational view showing the identification device mounted in the lug nut hole of a tire rim shown in section.

As shown in FIG. 3, an electronic solid state chip 12 is embedded within body 7. A spring attachment device is indicated generally at 14, is mounted on body 7. Attachment device 14 includes a pair of spring strips 15 and 16, at least one end 18 thereof, being molded in body 7. Opposite ends 19 may also be molded into the body if desired. Spring strips 15 preferably bow outwardly when in an at-rest position as shown in FIG. 3, so that when inserted into a lug nut hole 20 of a rim central flange 21, will bow outwardly beneath rim flange 21 as shown in FIG. 4, to retain device 6 therein. Preferably top surface 9 of device 6 will be generally aligned with top surface 23 of rim central flange 21.

Thus, during the vehicle assembly process, device 6 will have the preprogrammed electronic chip 12 therein and has been mounted on rim 3 by manually pushing conical body 7 into one of a number of lug nut holes 20 until top surface 9 is generally flush with top flange surface 23. This is accomplished relatively easy by thumb pressure just sufficient to collapse spring strips 15 and 16 until top surface 9 is generally flush with flange surface 23 at which position the spring strips 15 and 16 will be deformed outwardly as shown in FIG. 4 to resist the device 6 from prematurely backing outwardly from hole 20.

Although body 7 is shown as having a conical-shape, it can be cylindrical or have various other configurations without affecting the concept of the invention. Likewise, other types of retaining means can be used other than a spring device, such as dimensioning body 7 to closely match that of hole 20 whereby the device is retained therein by a friction slip-fit engagement.

It is readily seen in FIGS. 1 and 4 that when wheel assembly 1 is placed on a vehicle axis, that the threaded wheel stud will engage bottom surface 10 and will easily overcome the bias and retaining effect of springs 15 and 16 to dislodge device 6 from within opening 20. The removed device 6 is then collected for subsequent use in other wheel assemblies. Electronic chip 12 preferably is a solid state device and can have various features and modes of operation, all of which are well known in the art. One example is an active RF device such as shown and described in U.S. Pat. No. 6,036,179 where the output signals are easily read by a remote stationary or handheld interrogator as shown in this patent. Another example of such a RF device is shown in U.S. Pat. No. 5,573,611. Preferably, the electronic circuitry of chip 12 will be a passive circuit, that is, one that does not require its own power source but uses the power of the incoming interrogator signal to obtain the previously encoded data from chip 12 by reflecting back the interrogator signal. This eliminates the chip from having its own power source. Chip 12 will contain and transmit various information pertaining to the rim, tire, and valve stem of the wheel assembly.

Chip 12 is a dynamic chip which will both transmit and receive and store information for subsequent retransmission. For example, chip 12 will receive and store information from a wheel assembly balancing machine, a tire uniformity machine, etc. This information then is used in the vehicle assembly process to ensure that like tires are placed on the proper vehicles. Again, the electronic circuitry to accomplish this is well known in the art, and thus is not described in further detail below.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An identification device modified to fit in a wheel lug nut hole to identify a wheel assembly prior to mounting on a vehicle, said identification device comprising a conical-shaped body formed of a plastic material having a resilient mount extending outwardly from the body for removably mounting the device in the nut hole, and includes a radio frequency identification tag embedded within the body of the device.

2. The identification device defined in claim 1 wherein the resilient mount includes at least one spring.

3. The identification device defined in claim 1 wherein the resilient mount includes a pair of spring strips extending along opposed locations on the device.

4. The identification device defined in claim 1 wherein the tag contains an electronic circuit.

5. The identification device defined in claim 4 wherein the tag contains either an active or passive electronic circuit.

6. The identification tag defined in claim 1 wherein the conical-shaped body has a smooth conical outer surface.

7. In combination a wheel assembly including a rim having a plurality of lug nut holes formed therein and a tire mounted thereon, and an identification device removably mounted in one of the lug nut holes of the rim, said device including a conical-shaped body formed of a plastic material and containing a radio frequency identification tag embedded within the body and having a retention spring extending outwardly from the body for removably mounting the device in said lug nut hole.

8. The combination defined in claim 7 wherein the identification tag contains a passive circuit for forwarding information stored in said tag to a remote interrogator in response to a signal from said interrogator.

9. The combination defined in claim 7 wherein the body of the device has a smooth outer conical surface.

10. The combination defined in claim 7 wherein a pair of retention springs extend outwardly from the body and extend along opposite locations on the device.

11. The combination defined in claim 10 wherein the pair of retention springs are bowed spring strips and are bowed outwardly beneath the rim to retain the device in the lug nut hole.

12. The combination defined in claim 7 wherein the conical-shaped body has a flat top surface; and in which said flat top surface generally aligns with the adjacent surface of the rim surrounding the lug nut hole.

* * * * *